July 21, 1953  E. T. TUSON  2,646,309
COLLAPSIBLE TRAILER CARAVAN
Filed June 30, 1949  2 Sheets-Sheet 1

INVENTOR.
EDWIN THEO TUSON,
BY
Royal E Burnham,
ATTORNEY

July 21, 1953 E. T. TUSON 2,646,309
COLLAPSIBLE TRAILER CARAVAN
Filed June 30, 1949 2 Sheets-Sheet 2

INVENTOR.
EDWIN THEO TUSON
BY
Royal E Burnham,
ATTORNEY

UNITED STATES PATENT OFFICE 2,646,309

COLLAPSIBLE TRAILER CARAVAN

Edwin Theo Tuson, Wahroonga, New South Wales, Australia

Application June 30, 1949, Serial No. 102,321
In Australia July 13, 1948

1 Claim. (Cl. 296—23)

This invention relates to a trailer caravan which can be folded up into a compact unit for towing or storing and may be opened out into a commodious caravan for camping and may also be converted for use merely as a utility trailer.

Onto a wheeled trailer chassis of conventional or other suitable design is mounted a body comprising three main sections, so designed that, for travelling or storing, the front and the rear sections may be folded one over the other onto the central section, thus greatly reducing the bulk and height, lowering the centre of gravity, maintaining normal rear vision for the driver of the towing vehicle, and minimising wind resistance, thereby eliminating the principal objections to the unwieldy bulk for towing and storing of the most common type of trailer caravan.

The central section of the trailer body comprises two sides and a bottom or floor. Hingedly mounted at each end of the said floor are detachable end sections each comprising, when closed one over the other in lid-like fashion, an end, two sides and a top, so that, when opened up for occupation as a caravan, the floor area of the central section is approximately doubled, and when closed up for towing, the three sections resemble a compact box-like trailer, though then having single ends, a double top and triple fold sides, the whole being of inconsiderable overall height.

In the accompanying drawings which illustrate one form of the invention:

Figure 1:
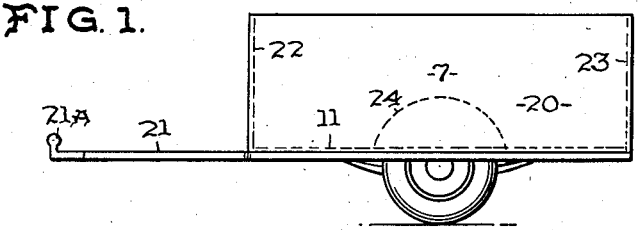
Fig. 1 is a side elevation in the form of a utility trailer.
Figure 2:
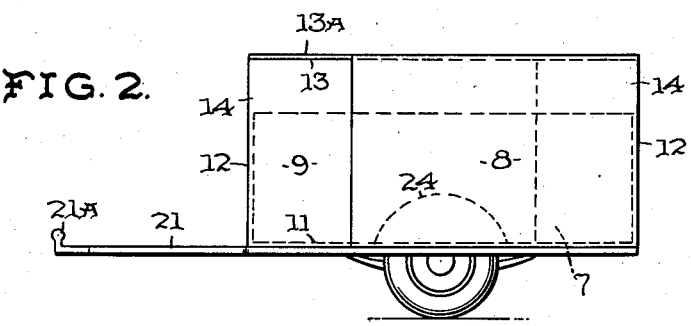
Fig. 2 is a similar view, converted into a caravan and folded for towing.
Figure 3:
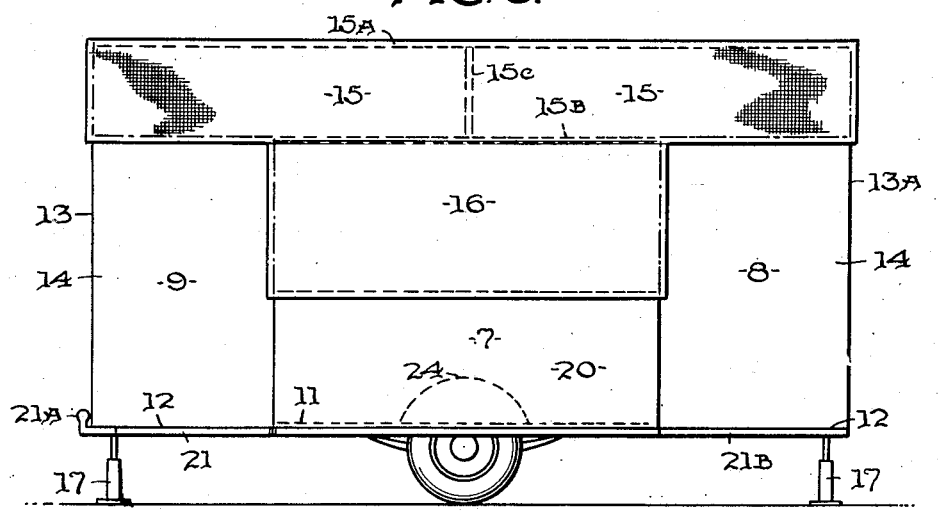
Fig. 3 is a similar view, showing the unit opened up for occupation as a caravan.
Figure 4:
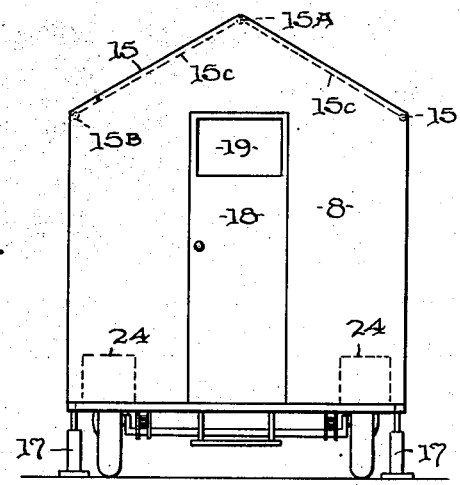
Fig. 4 is a rear end elevation of the caravan opened up as in Fig. 3.

Detachably and hingedly secured at each end of the floor 11 of utility trailer portion 7, the front board 22 and the tail board 23 thereof first having been removed, are caravan end sections 8 and 9, each comprising a floor 12, an end 13, 13A, and sides 14, 14, the said utility trailer portion forming the central section of the complete caravan, section 9 forming the front section and section 8 forming the rear section.

When opened up for occupation as a caravan, the said three sections are covered by a canvas or other suitable roofing 15, which is given the desired slope by correspondingly shaping the ends 13, 13A, and supported by means of a detachable two piece ridge pole or the like 15A with centre supports 15C and detachable eave poles or the like 15B; the spaces between the side walls 14 and the trailer sides 20 are filled by blinds 16 from the roofing or by movable sections mounted on the sides 20 or by sliding panels or the like.

In the opened up caravan position the end sections are supported by the drawbar assembly 21 and by hinged or sliding chassis extensions 21B or the like, and the erected caravan is supported from the ground by hinged or detachable adjustable legs 17.

The rear wall of end section 8 is provided with a door 18 incorporating a window 19, and section 9 and other wall parts may be fitted with windows, ventilators and the like.

Figure 5:
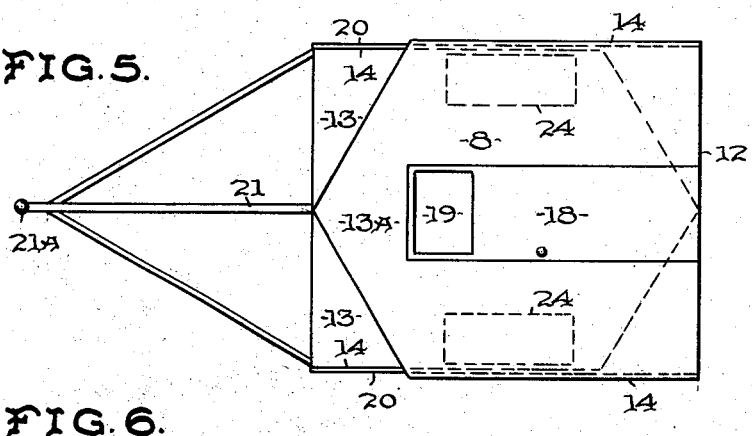
Fig. 5 is a plan of the caravan folded up for towing as in Fig. 2.
Figure 6:
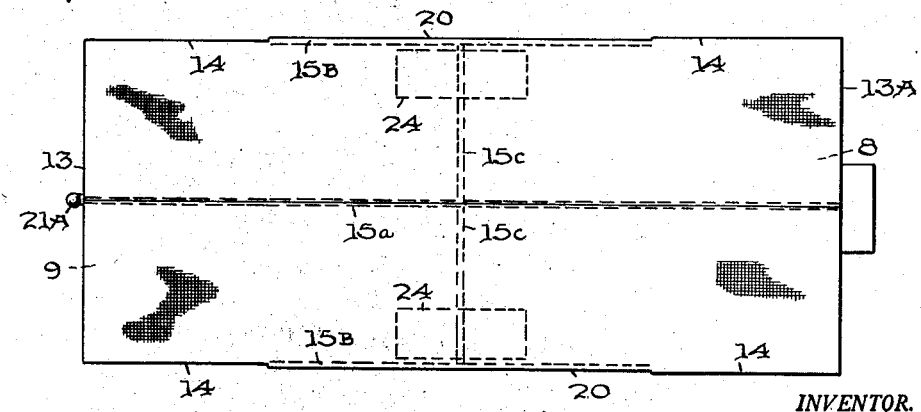
Fig. 6 is a plan of the caravan opened up as in Fig. 3 and Fig. 4.

When the erected caravan is to be folded up for towing or storing, the roofing 15, the ridge pole 15A, the centre supports 15C and the eave poles 15B are removed and placed in section 7; section 9 is closed on its hinges to lie over section 7 with the sides 14 fitting into spaces provided between mudguards 24 and sides 20; section 8 is then folded down in like manner, covering sections 7 and 9 as illustrated in Fig. 5.

When the trailer section 7 is required for use as a utility trailer, the detachable end sections 8 and 9 are removed at their hinges and front board 22 and tail board 23 are fitted in their stead.

A drawbar 21 and coupling 21A are fitted for attachment of the construction to a towing vehicle.

I claim:

A collapsible caravan comprising a wheeled vehicle having supporting wheels one on each side thereof and including a central section having side walls outside of said wheels, and two rigid end sections each with a floor, and as housing elements rigid side walls and end walls, said housing end sections being hinged at ends of the floor of said central section being of lengths to overlap one another more than half their lengths when folded over one another and being foldable intact one inside and the other outside of the side walls of said central section, the overall height of the vehicle and the parts thereon when folded being slightly more than the height of said central section side walls, the arrangement being such that, when said housing end sections are swung on their hinges to erect position, they constitute complete housing ends over which a cover roof may be disposed, and the over-all width of the housing is greater than the over-all width of the supporting wheels, while the total height of the whole structure is reduced by approximately one half when the elements thereof are folded, and mudguards for said vehicle wheels inside of said central section side walls and spaced therefrom to permit one of said housing end sections to fold down between said mudguards and adjacent side wall.

EDWIN THEO TUSON.

References Cited in the file of this patent

UNITED STATES PATENTS

| Number | Name | Date |
|---|---|---|
| 1,280,841 | Reid | Oct. 8, 1918 |
| 1,715,971 | Wilson | June 4, 1929 |
| 2,003,598 | Lehrer et al. | June 4, 1935 |
| 2,003,816 | Allen et al. | June 4, 1935 |
| 2,015,176 | Ebenhack | Sept. 24, 1935 |
| 2,154,365 | Taylor | Apr. 11, 1939 |
| 2,216,553 | Greene et al. | Oct. 1, 1940 |

FOREIGN PATENTS

| Number | Country | Date |
|---|---|---|
| 590,029 | Great Britain | July 7, 1947 |
| 858,592 | France | May 13, 1940 |